(12) United States Patent
Kim et al.

(10) Patent No.: US 9,195,348 B2
(45) Date of Patent: Nov. 24, 2015

(54) ELECTROSTATIC CAPACITIVE TYPE TOUCH SCREEN PANEL

(75) Inventors: Dongsup Kim, Seoul (KR); Byungkoo Kang, Paju-si (KR); Sohaeng Cho, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 637 days.

(21) Appl. No.: 13/243,878

(22) Filed: Sep. 23, 2011

(65) Prior Publication Data

US 2012/0098787 A1   Apr. 26, 2012

(30) Foreign Application Priority Data

Oct. 20, 2010   (KR) .................. 10-2010-0102255

(51) Int. Cl.
*G06F 3/044*   (2006.01)

(52) U.S. Cl.
CPC .................................. *G06F 3/044* (2013.01)

(58) Field of Classification Search
USPC ........................................ 345/173; 178/18.06
See application file for complete search history.

(56) References Cited

U.S. PATENT DOCUMENTS

| 2008/0277259 | A1* | 11/2008 | Chang ............. G06F 3/044 200/600 |
| 2009/0084613 | A1* | 4/2009 | Yang .............. G06F 3/044 178/18.06 |
| 2009/0140987 | A1* | 6/2009 | Yang ................. 345/173 |
| 2009/0184937 | A1* | 7/2009 | Grivna ............... 345/173 |
| 2009/0236151 | A1* | 9/2009 | Yeh et al. .......... 178/18.03 |
| 2009/0244021 | A1 | 10/2009 | Matsuo et al. |
| 2010/0073310 | A1* | 3/2010 | Liang et al. ....... 345/173 |

FOREIGN PATENT DOCUMENTS

| JP | 2010-0181747 A | 8/2010 |
| KR | 10-2009-0102663 A | 9/2009 |
| KR | 10-2009-0122586 A | 12/2009 |

* cited by examiner

*Primary Examiner* — William H Mayo, III
*Assistant Examiner* — Krystal Robinson
(74) *Attorney, Agent, or Firm* — Birch, Stewart, Kolasch & Birch, LLP (57) ABSTRACT

A touch screen panel according to an embodiment includes an electrode forming part including a plurality of first electrode serials arranged in parallel on a substrate in a first direction and a plurality of second electrode serials arranged on the substrate to cross over the first electrode serials; and a routing wire forming part formed on the substrate, and including a plurality of first routing wires respectively connected to the plurality of first electrode serials and a plurality of second routing wires respectively connected to the plurality of second electrode serials.

9 Claims, 6 Drawing Sheets

FIG. 1

RELATED ART

FIG. 2

RELATED ART

ELECTROSTATIC CAPACITIVE TYPE
TOUCH SCREEN PANEL

This application claims the benefit of Korean Patent Application No. 10-2010-0102255 filed on Oct. 20, 2010, the entire contents of which is incorporated herein by reference for all purposes as if fully set forth herein.

BACKGROUND

1. Field

This document relates to an electrostatic capacitive type touch screen panel.

2. Related Art

In recent years, display devices, such as a liquid crystal display, an electroluminescent display, and a plasma display panel, having a quick response speed, low power consumption, and an excellent color reproduction rate, have been in the spotlight. These display devices have been used for various electronic products such as a television, a monitor for a computer, a laptop computer, a mobile phone, a display unit of a refrigerator, a personal digital assistant, and an automated teller machine. In general, these display devices interface with various input devices such as a keyboard, a mouse, and a digitizer. However, in order to use a separate input device, such as a keyboard or mouse, a user has to deal with the inconveniences of learning how to use it and taking up space, thus making it difficult to improve the degree of completion of the product. Therefore, the demand for input devices that are convenient and easy to use and reduce an erroneous operation is growing more and more. In response to this demand, a touch screen panel for enabling a user to input information by directly touching the screen with their hand or a pen was suggested.

Because the touch screen panel has a simple configuration, causes few erroneous operations, can perform an input action without a separate input device, and offers the convenience of allowing the user to quickly and easily manipulate content displayed on the screen, the touch screen panel is applied to various display devices.

Touch screen panels are classified into a resistive type, a capacitive type, an electromagnetic type and so on according to a detection method of a touched portion. The resistive type touch screen panel detects a touched portion by a voltage gradient according to resistance in a state that a DC voltage is applied to metal electrodes formed on an upper plate or a low plate. The capacitive type touch screen panel senses a touched position according to a difference in capacitance created in an upper or lower plate when the user touches an equipotential conductive film formed on the upper or lower plate. The electromagnetic type touch screen panel detects a touched portion by reading an LC value induced as an electromagnetic pen touches a conductive film.

Figure 1:
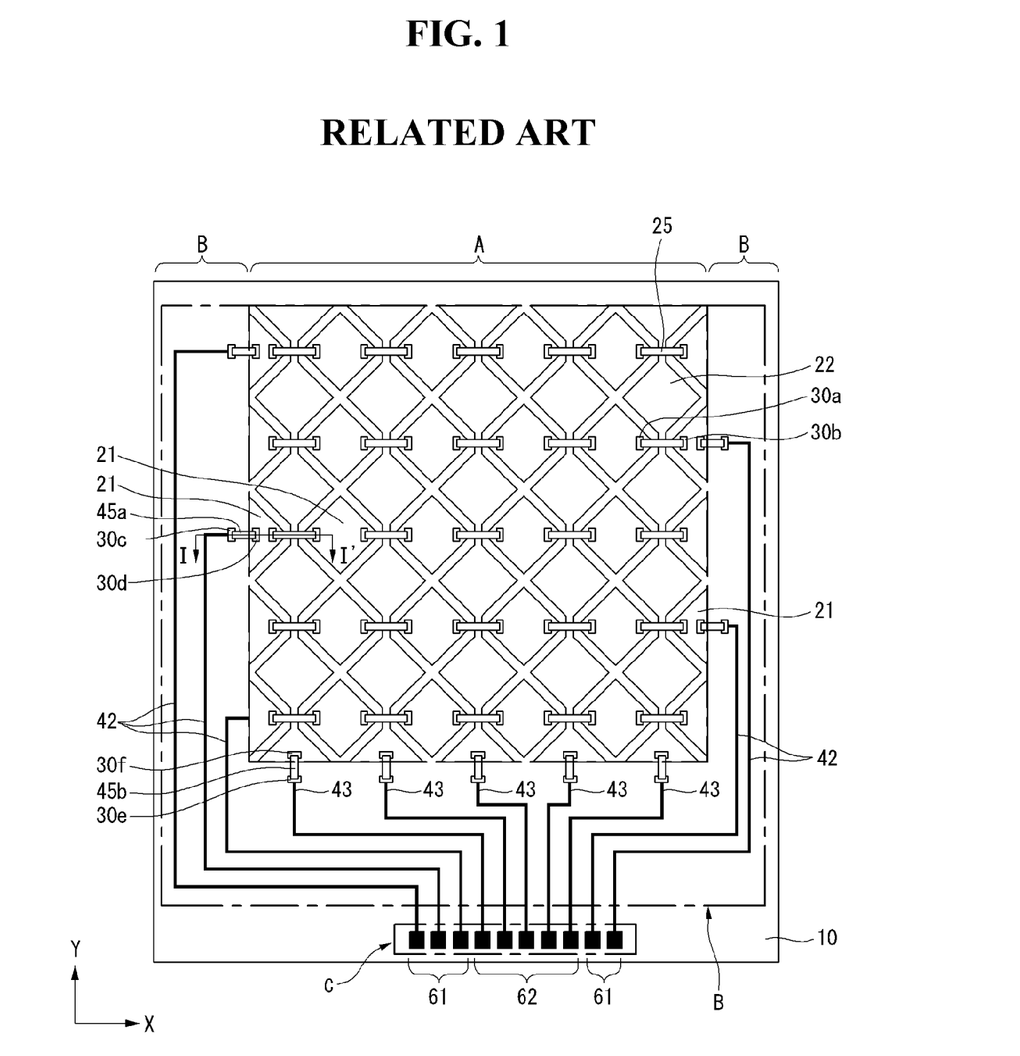
FIG. 1 is a plan view of an electrostatic capacitive type touch screen panel according to the related art.

Hereinafter, a related art electrostatic capacitive type touch screen panel will be described with reference to FIG. 1. FIG. 1 is a plan view of a related art electrostatic capacitive type touch screen panel.

Referring to FIG. 1, the related art electrostatic capacitive type touch screen panel comprises an electrode forming part A, a routing wire forming part B, and a pad forming part C.

The electrode forming part A comprises a plurality of first electrodes 21 formed on a substrate 10 and arranged in parallel in a first direction (e.g., the X-axis direction) and a plurality of second electrodes 22 arranged in a vertical direction (e.g., the Y-axis direction) to cross over the first electrodes 21. Although the first electrodes 21 and the second electrodes 22 cross over each other, they are kept electrically insulated by an insulation layer (not shown). Moreover, the neighboring first electrodes 21 are separated from each other, but connected to each other by bridges 25, thereby forming a first channel in a row direction. That is, the bridges 25 connect the neighboring first electrodes 21 to each other via contact holes 30a and 30b formed in the insulation layer 30 covered on top of the first and second electrodes 21 and 22, whereby a first channel having the first electrodes 21 connected together is formed in a row direction. Further, the second electrodes 22 are formed integral with each other, thereby forming a second channel in a column direction to cross over the first channel.

The routing wire forming part B comprises a plurality of first routing wires 42 formed outside the electrode forming part A and connected to the plurality of first electrodes 21 via contact holes 30c and 30d and a plurality of second routing wires 43 connected to the plurality of second electrodes 22 via contact holes 30e and 30f. The first routing wires 42 and the first electrodes 21 are connected to each other by first jumping bridges 45a formed on the insulation layer 30, and the second routing wires 43 and the second electrodes 22 are connected to each other by second jumping bridges 45b.

The pad forming part C comprises a plurality of first pads 61 connected to the plurality of first electrodes 21 via the plurality of first routing wires 42 and a plurality of second pads 62 connected to the plurality of second electrodes 22 via the plurality of second routing wires 43.

As thus, the related art electrostatic capacitive type touch screen panel requires the first and second jumping bridges 45a and 45b to connect the first and second electrodes 21 and 22 of the electrode forming part A to the first and second routing wires 42 and 43 of the routing wire forming part B. The jumping bridges 45a and 45b and the first and second routing wires 42 and 43 are, however, made of metal in order to reduce electrical resistance. Therefore, when the touch screen panel is driven, the first and second jumping bridges 45a and 45b and the first and second routing wires 42 and 43 become visible at the interface between the electrode forming part A and the routing wire forming part B (hereinafter, referred to as a visibility phenomenon).

Figure 2:
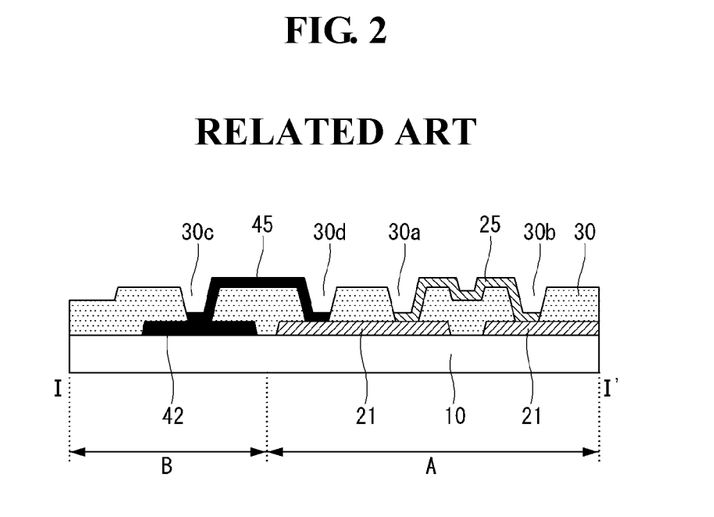
FIG. 2 is a cross-sectional view taken alone line I-I' of the touch screen panel shown in FIG. 1.

Moreover, as the insulation layer 30 is formed between the first and second electrodes 21 and 22 of the electrode forming part A and the first and second routing wires 42 and 43 of the routing wire forming part B, the contact holes 30c, 30d; 30e, 30f need to be formed in the insulation layer 30 in order to connect the first and second electrodes 21 and 22 to the first and second routing wires 42 and 43. In general, in order to improve touch accuracy on the touch screen panel, the first and second electrodes 21 and 22 are made so small, and the first and second routing wires 42 and 43 have a very small line width because they are formed to be compact in a narrow space. Accordingly, the diameter of the contact holes 30c, 30d; 30e, 30f formed in the insulation layer 30 to connect the first and second electrodes 21 and 22 and the first and second routing wires 42 and 43 is very small. As the resistance of a certain object is in inverse proportion to the cross-sectional area thereof, the resistance of the first and second jumping bridges 45a and 45b filled in the contact holes 30c, 30d; 30e, 30f having a small diameter increases. Accordingly, if static electricity enters from the outside during a panel fabricating process, module fabricating process, or product transportation, a temporarily high current abruptly flows through the first and second jumping bridges 45a and 45b, and this may damage the contact holes 30c, 30d; 30e, 30f.

SUMMARY

An aspect of this document is to provide a touch screen panel, which prevents first and second jumping bridges and first and second routing wires from becoming visible at the interface between an electrode forming part and a routing wire forming part, and prevents damage of contact holes caused by static electricity.

To achieve these and other advantages and in accordance with the purpose of this invention, as embodied and broadly described, a touch screen panel includes an electrode forming part comprising a plurality of first electrode serials arranged in parallel on a substrate in a first direction and a plurality of second electrode serials arranged on the substrate to cross over the first electrode serials; a routing wire forming part formed on the substrate, and including a plurality of first routing wires respectively connected to the plurality of first electrode serials and a plurality of second routing wires respectively connected to the plurality of second electrode serials; and a plurality of insulation patterns formed between the first electrode serials and the second electrode serials at regions in which the first electrode serials crosses over the second electrode serials so that the first electrode serials are insulated from the second electrode serials, wherein each of the plurality of first electrode serials comprises a plurality of first electrode patterns electrically connected to each other, and each of the plurality of second electrode serials comprises a plurality of second electrode patterns electrically connected to each other, each of the first electrode patterns of the first electrode serials connected to the first routing wires comprises first extension which extends from the electrode forming part to the routing wire forming part and are connected to the first routing wires; and each of the second electrode patterns of the second electrode serials connected to the second routing wires comprises second extension which extends from the electrode forming part to the routing wire forming part, and is connected to the second routing wires.

In the touch screen panel, the first and second extensions are formed of a transparent conductive material.

In the touch screen panel, the lengths of the first extensions are all the same, and the lengths of the second extensions are all the same.

In the touch screen panel, the length of at least one of the first extensions is different from those of other first extensions and the length of at least one of the second extensions is different from those of other second extensions.

In the touch screen, the lengths of the first extensions are all the same, and the length of at least one of the second extensions is different from those of other second extensions.

In the touch screen panel, the length of at least one of the first extensions is different from those of other first extensions, and the lengths of the second extensions are all the same.

In the touch screen panel, the first extension is connected with first routing wire via a first contact hole, and the second extension is connected with second routing wire via a second contact hole.

In the touch screen panel, the plurality of first extensions are formed to be spaced from the electrode forming part at equal distances, and the plurality of second extensions are formed to be spaced from the electrode forming part at equal distances.

In the touch screen panel, at least one of the plurality of the first extensions from the electrode forming part at different distances, and the plurality of second extensions are formed to be spaced from the electrode forming part at equal distances.

In the touch screen panel, the plurality of first extensions are formed to be spaced from the electrode forming part at equal distances, and at least one of the plurality of second extensions is formed to be spaced from the electrode forming part at different distances.

In the touch screen panel, the plurality of first extensions are formed to be spaced from the electrode forming part at different distances, and the plurality of second extensions are formed to be spaced from the electrode forming part at different distances.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 3:
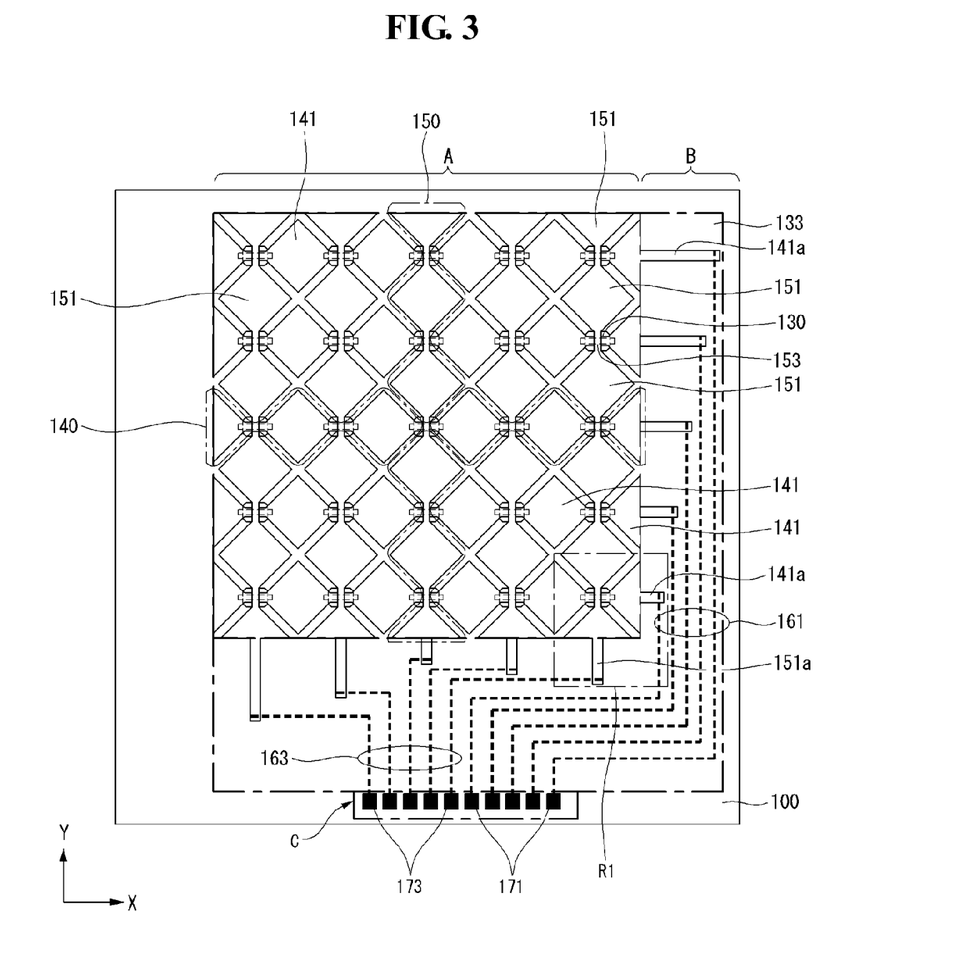
FIG. 3 is a plan view of a touch screen panel according to a first exemplary embodiment of the present invention.
Figure 4A:
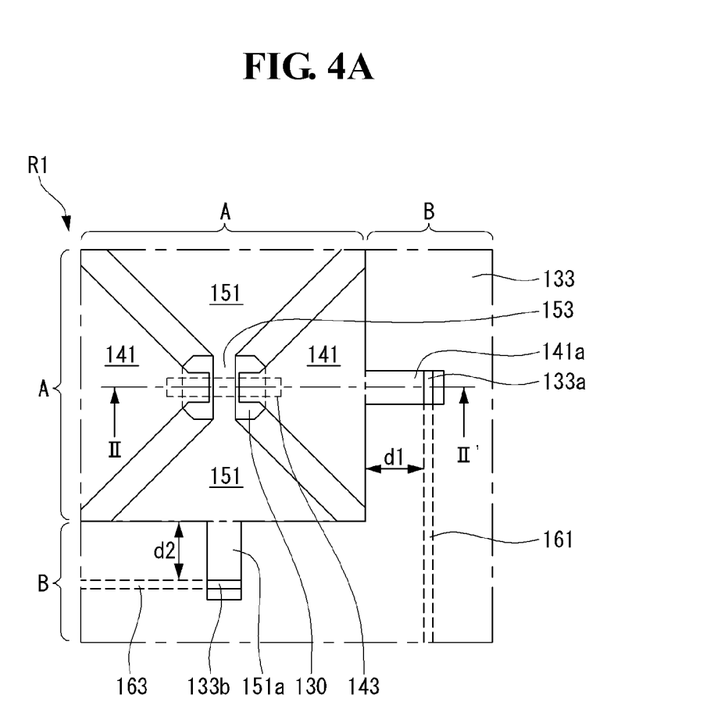
FIG. 4A is an enlarged plan view of portion R1 of the touch screen panel shown in FIG. 3.
Figure 4B:
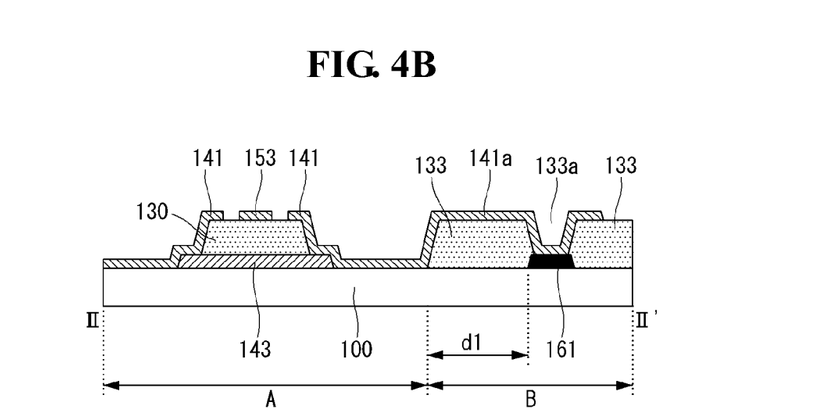
FIG. 4B is a cross-sectional view taken along line II-II' shown in FIG. 4A.

Hereinafter, an implementation of this document will be described in detail with reference to the attached drawings. Throughout the specification, like reference numerals denote like components FIG. 3 is a plan view of a touch screen panel according to a first exemplary embodiment of the present invention. FIG. 4A is an enlarged plan view of portion R1 of the touch screen panel shown in FIG. 3. FIG. 4B is a cross-sectional view taken along line II-II' shown in FIG. 4a;

Referring to FIGS. 3 to 4B, the electrostatic capacitive type touch screen panel according to an exemplary embodiment of the present invention comprises an electrode forming part A, a routing wire forming part B formed outside the electrode forming part A, and a pad forming part C formed on one side of the routing wire forming part B.

The electrode forming part A comprises a plurality of first electrode serials 140 arranged in parallel in a first direction (e.g., the X-axis direction) and a plurality of second electrode serials 150 arranged in a vertical direction (e.g., the Y-axis direction) to cross over the first electrode serials 140. Each of the first electrode serials 140 comprises first electrode patterns 141 having a triangular, rectangular, diamond, or polygonal shape and first connecting patterns 143 for connecting neighboring first electrode patterns 141. Each of the second electrode serials 150 comprises second electrode patterns 151 having a triangular, rectangular, diamond, or polygonal shape and second connecting patterns 153 for connecting neighboring second electrode patterns 151. In the electrode forming part A, first insulation patterns 130 for electrically insulating the first electrode serials 140 and the second electrode serials 150 are formed at a region the first electrode serials 140 cross over the second electrode serials 150.

In the first exemplary embodiment of the present invention, the first connecting patterns 143 are formed separately from the first electrode patterns 141, whereas the second connecting patterns 153 are formed integral with the second electrode patterns 151. In this way, the neighboring first electrode patterns 141 are separated from each other, but connected by the first connecting patterns 143 in the first direction (e.g., the X-axis direction), thereby forming a first channel in a row direction. However, the neighboring second electrode patterns 151 are formed integral with the second connecting patterns 153 and connected in the second direction (e.g., the Y-axis direction), thereby forming a second channel in a column direction to cross over the first channel. In the first exemplary embodiment of the present invention, the first and second electrode patterns 141 and 151 and the first and second connecting patterns 143 and 153 for connecting the first and second electrode patterns 141 and 151 are formed of a transparent conductive material such as indium tin oxide (ITO), indium zinc oxide (IZO) or gallium-doped zinc oxide (GZO).

Further, as shown in FIGS. 4A and 4B, the first electrode pattern 141 connected to the first routing wiring line 161 has a first extension 141a extending from the electrode forming part A to the routing wire forming part B, and the second electrode pattern 151 connected to the second routing wiring line 163 has a second extension 151a extending from the electrode forming part A to the routing wire forming part B. Although the first exemplary embodiment of the present invention is shown in FIG. 3 that the lengths of the first extensions 141a and the lengths of the second extensions 151a are all different, this is merely an example and the present invention is not limited thereto. Unless the first routing wire 161 and the second routing wire 163 are visible when the touch screen panel is operated, the lengths of the first extensions 141a and the lengths of the second extensions 151a may be entirely or partly the same. An example of the first extensions 141a and the second extensions 151a having the same length will be described in details in a second exemplary embodiment of the present invention.

The routing wire forming part B is formed outside the electrode forming part A, and comprises a plurality of first routing wires 161 connected to a plurality of first electrode serials 140 and a plurality of second routing wires 163 connected to a plurality of second electrode serials 150. The first routing wires 161 are formed on a substrate 100, spaced at least a predetermined distance d1 from the first electrode patterns 141, and the second routing wires 163 are formed on the substrate 100, spaced at least a predetermined distance d2 from the second electrode patterns 151. When the spacing distances d1 and d2 from the electrode forming part A to the first and second routing wires 161 and 163 are maintained at at least 1.5 µm, the first and second routing wires 161a and 163 are prevented from being visible when the touch screen panel is operated.

Meanwhile, the first and second routing wires 161 and 163 are covered with a second insulation pattern 133, and, as shown in FIGS. 4A and 4B, the second insulation pattern 133 has a first contact hole 133a for connecting the first routing wire 161 and the first extension 141a of the first electrode pattern 141 and a second contact hole 133b for connecting the second routing wire 153 and the second extension 151a of the second electrode pattern 151. The first contact holes 133a are spaced from the electrode forming part A at a predetermined distance d1 or more, and the second contact holes 133b are spaced from the electrode forming part A at a predetermined distance d2 or more. The predetermined distance d1 or d2 is maintained at least 1.5 µm. The first and second routing wires 161 and 163 are prevented from being visible when the touch screen panel is operated because the first and second routing wires 161 and 163 are spaced from the electrode forming part A by the extensions 141a and 151a.

The first and second routing wires 161 and 163 are formed of metals, such as Al, ALND, Mo, MoTi, Cu, CuOx, or Cr.

The pad forming part C comprises a plurality of first pads 171 connected to a plurality of first electrode serials 140 via a plurality of first routing wires 161 and a plurality of second pads 173 connected to a plurality of second electrode serials 150 via a plurality of second routing wires 163.

According to the touch screen panel of the first exemplary embodiment, no separate jumping bridges are used for connecting the first electrode patterns 141 to the first routing wires 161 and for connecting the second electrodes pattern 151 to the second routing wires 163, but the first and second electrode patterns 141 and 151 are connected to the first and second routing wires 161 and 163 by using the first and second extensions 141a and 151a extending from the first and second electrode patterns 141 and 151 formed of a transparent conductive material. Moreover, as the first and second routing wires 161 and 163 formed of metal are spaced predetermined distances d1 and d2 from the electrode forming part A, the first and second routing wires 161 and 163 and the first and second extensions 141a and 151a can be prevented from becoming visible at the interface between the electrode forming part A and the routing wire forming part B when the touch screen panel is operated.

Further, in the electrode forming part A, the first insulation patterns 130 are formed only at region in which the first electrode serials 140 cross over the second electrode serials 150. Also, there are no contact holes for connection to the first and second routing wires. Thus, any damage caused by static electricity that occurs during a process or during product transportation can be minimized.

Figure 5:
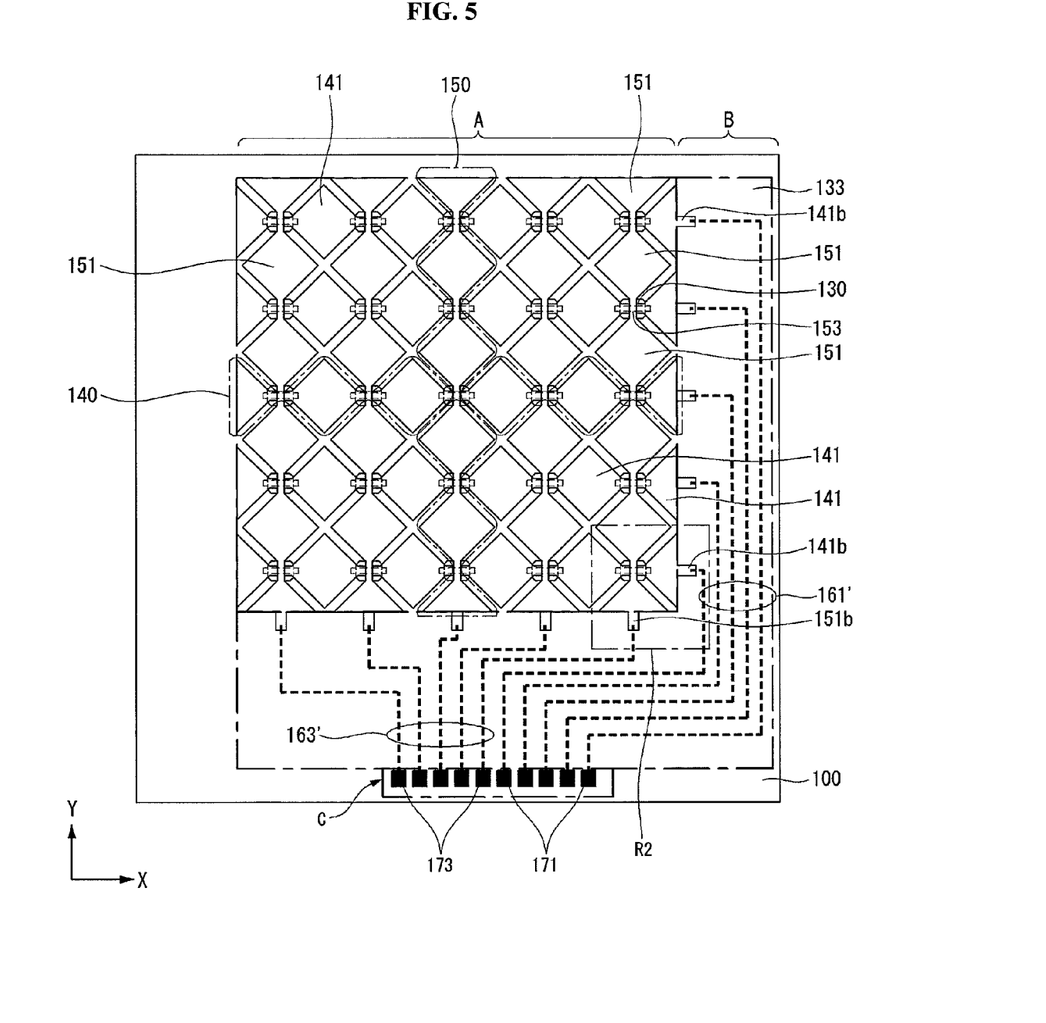
FIG. 5 is a plan view of a touch screen panel according to a second exemplary embodiment of the present invention.
Figure 6A:
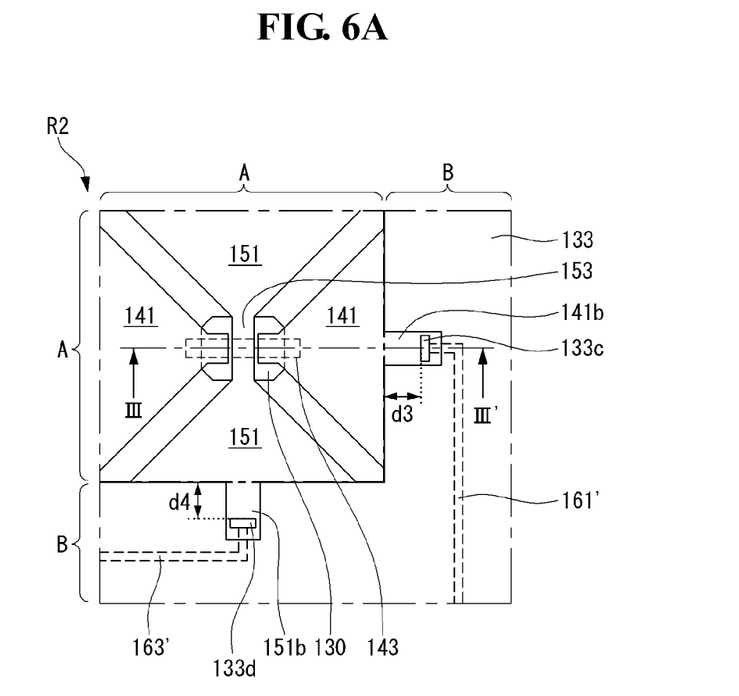
FIG. 6A is an enlarged plan view of portion R2 of the touch screen shown in FIG. 5.
Figure 6B:
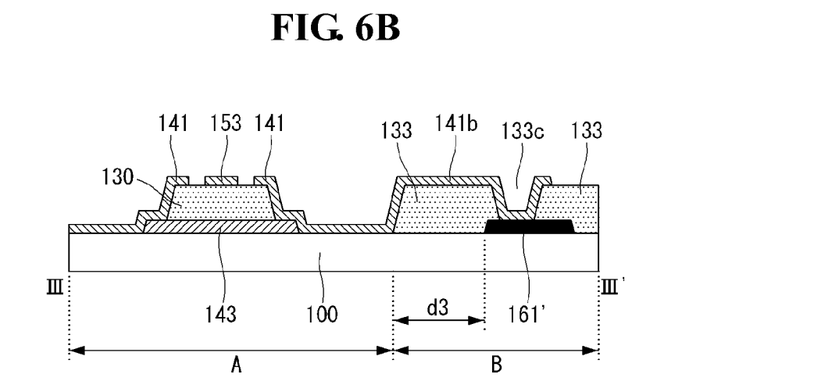
FIG. 6B is a cross-sectional view taken along line III-III' shown in FIG. 6A.

Next, a touch screen panel according to a second exemplary embodiment of the present invention will be described. FIG. 5 is a plan view of a touch screen panel according to a second exemplary embodiment of the present invention. FIG. 6A is an enlarged plan view of portion R2 of the touch screen shown in FIG. 5. FIG. 6B is a cross-sectional view taken along line III-III' shown in FIG. 6A.

The touch screen panel according to the second exemplary embodiment of the present invention is substantially the same as the first exemplary embodiment, except that the lengths of the first extensions 141b of the first electrode pattern 141 and the lengths of the second extensions 151b of the second electrode pattern 151 are all the same and the configuration of the first and second routing wires 161' and 163' is changed, and the formation positions of the first contact holes 133c and the second contact holes (not shown) are changed. Accordingly, the description of the same parts as the first exemplary embodiment will be omitted, and only the differences will be described.

First of all, referring to FIG. 5, the touch screen panel according to the second exemplary embodiment of the present invention comprises an electrode forming part A, a routing wire forming part B formed outside the electrode forming part A, and a pad forming part C formed on one side of the routing wire forming part B like the touch screen panel of the first exemplary embodiment.

In the electrode forming part A according to the second exemplary embodiment of the present invention, the lengths of the first extensions 141b of the first electrode pattern 141 and the lengths of the second extensions 151b of the second electrode pattern 151 are the same, unlike the first extensions 141a of the first electrode pattern 141 and the second extensions 151a of the second electrode pattern 151 according to the first exemplary embodiment of the present invention. Specifically, in the second exemplary embodiment, as shown in FIGS. 6A and 6B, the first electrode pattern 141 connected to the first routing wire 161' has the first extensions 141b extending from the electrode forming part A to the routing wire forming part B, and the second electrode pattern 151 connected to the second routing wire 163' has the second extensions 151b extending from the electrode forming part A to the routing wire forming part B. The only difference between the first and second exemplary embodiments is that the lengths of the first extensions 141a and the lengths of the second extensions 151a are all different while the lengths of the first extensions 141b are all the same and the lengths of the second extensions 151b are all the same.

The lengths of the first and second extensions 141b and 151b are not limited to those of the first and second extensions 141b and 151b shown in FIGS. 3 and 5, but the lengths of the first extensions 141a and 141b and the lengths of the second extensions 151a and 151b may be partly the same unless the first and second routing wires 161, 163; 161', 163' are visible during the operation of the touch screen panel due to the spacing distances d1 and d3 between the first electrode pattern 141 and the first contact holes 133a and 133c and the spacing distances d2 and d4 between the second electrode pattern 151 and the second contact holes 133b and 133d. In the present invention, for example, the lengths of the first and second extensions are as follows:

(1) the lengths of the first extensions are all the same, and the lengths of the second extensions are all the same;
(2) the length of at least one of the first extensions is different from those of other first extension, and the length of at least one of the second extensions is different from those of other second extensions;
(3) the lengths of the first extensions are all the same, and the length of at least one of the second extensions is different from those of other second extensions; and
(4) the length of at least one of the first extensions is different from those of other first extensions, and the lengths of the second extensions are all the same.

In the routing wire forming part B according to the second exemplary embodiment of the present invention, the first and second extensions of the first and second electrode patterns 141 and 151 have the same length. Thus, first and second extensions 141b and 151b of the second exemplary embodiment are different from the first and second extensions 141a and 151a of the first exemplary embodiment in that the first and second extensions 141b and 151b are extended in a same distance from each side of the electrode forming part A. Also, the first and second contact holes 133c and 133d of the second exemplary embodiment are different from the first and second contact holes 133a and 133b of the first exemplary embodiment in that the first and second contact holes 133c and 133d are spaced a same distance from each side of the electrode forming part A.

The relationship of the configuration of the first and second routing wirings 161, 163; 161' 163' shown in FIGS. 3 and 5 is merely an example, and the first and second routing wires may be formed in any of the following ways depending on the relationship between the electrode forming part A and the first and second routing wires 161, 163; 161' 163':

(1) the plurality of first extensions are spaced from the first electrode forming part at equal distances, and the plurality of second extensions are spaced from the electrode forming part at equal distances;
(2) at least one of the plurality of first extensions is spaced from the electrode forming part at different distances, and the plurality of second extensions are spaced from the electrode forming part at equal distances;
(3) the plurality of first extensions are spaced from the electrode forming part at equal distances, and at least one of the plurality of second at equal distances are spaced from the electrode forming part at different distances; and
(4) the plurality of first at different distances are spaced from the electrode forming part at different distances, and the plurality of second at different distances are spaced from the electrode forming part at different distances.

No separate jumping bridges are used for connecting the first electrode patterns and the first routing wires and connecting the second electrode patterns and the second routing wires, but the first and second electrode patterns are connected to the first and second routing wires by using the first and second extensions extending from the first and second electrode patterns formed of a transparent conductive material. Moreover, as the first and second routing wires formed of metal are spaced predetermined distances from the electrode forming part, the first and second routing wires and the first and second extensions can be prevented from becoming visible in the interface between the electrode forming part and the routing wire forming part when the touch screen panel is operated.

Further, in the electrode forming part A, the first insulation patterns are formed only at regions in which the first electrode serials cross over the second electrode serials, but have no contact holes for connection to the first and second routing wires. Thus, any damage caused by static electricity that occurs during a process or during product transportation can be minimized.

The touch screen panel according to the exemplary embodiments of the present invention may be applied to a display device including a liquid crystal display (LCD), a field emission display (FED), a plasma display panel (PDP), an electroluminescence device (EL), an electrophoresis display, and so on. In this case, the substrate of the touch screen panel according to the exemplary embodiments of the present invention can be used as the substrate of the display device.

From the above description, it will be apparent to those skilled in the art that various changes and modifications can be made without departing from the technical spirit of the present invention. Accordingly, the scope of the present invention should not be limited by the exemplary embodiments, but should be defined by the appended claims.

What is claimed is:

1. A touch screen panel comprising:
an electrode forming part comprising a plurality of first electrode serials arranged in parallel on a substrate in a first direction and a plurality of second electrode serials arranged on the substrate to cross over the first electrode serials;
a routing wire forming part outside the electrode forming part on the substrate, and including a plurality of first routing wires respectively connected to the plurality of first electrode serials and a plurality of second routing wires respectively connected to the plurality of second electrode serials;
a pad forming part outside the routing wire forming part on the substrate, and including a plurality of first pads respectively connected to a plurality of first electrode serials via the plurality of first routing wires and a plurality of second pads respectively connected to the plurality of second electrode serials via the plurality of second routing wires on the substrate;

a plurality of first insulation patterns separated from each other in the electrode forming part and formed between the first electrode serials and the second electrode serials at regions in which the first electrode serials crosses over the second electrode serials so that the first electrode serials are insulated from the second electrode serials; and a second insulation pattern covering the first and second routing wires in the routing wire forming part, and including first contact holes and second contact holes, wherein each of the plurality of first electrode serials comprises a plurality of first electrode patterns separated from each other, and a plurality of first connection patterns connecting first electrode patterns adjacent to each other and directly formed on the substrate, wherein each of the plurality of second electrode serials comprises a plurality of second electrode patterns electrically connected to each other via a plurality of second connection patterns which are integral to the second electrode patterns, wherein each of the first electrode patterns connected to the first routing wires comprises a first extension which extends from the electrode forming part to the routing wire forming part and is connected to the first routing wire via the first contact hole, wherein each of the second electrode patterns connected to the second routing wires comprises a second extension which extends from the electrode forming part to the routing wire forming part, and is connected to the second routing wire via the second contact hole, wherein each of the first insulation patterns is formed on one of the first connection patterns and under one of the second connection patterns, and wherein the lengths of the first extensions are different from each other, and the first routing wires are substantially vertically connected to the first extensions and arranged in parallel with each other.

2. The touch screen panel according to claim 1, wherein the first and second extensions are formed of a transparent conductive material.

3. The touch screen panel according to claim 1, wherein the lengths of the first extensions are all the same, and the lengths of the second extensions are all the same.

4. The touch screen panel according to claim 1, wherein the first extension is connected with first routing wire via a first contact hole, and the second extension is connected with second routing wire via a second contact hole.

5. The touch screen panel according to claim 1, wherein the plurality of first extensions are formed to be spaced from the electrode forming part at equal distances, and the plurality of second extensions are formed to be spaced from the electrode forming part at equal distances.

6. The touch screen panel according to claim 1, wherein at least one of the plurality of the first extensions from the electrode forming part at different distances, and the plurality of second extensions are formed to be spaced from the electrode forming part at equal distances.

7. The touch screen panel according to claim 1, wherein the plurality of first extensions are formed to be spaced from the electrode forming part at equal distances, and at least one of the plurality of second extensions is formed to be spaced from the electrode forming part at different distances.

8. The touch screen panel according to claim 1, wherein the plurality of first extensions are formed to be spaced from the electrode forming part at different distances, and the plurality of second extensions are formed to be spaced from the electrode forming part at different distances.

9. The touch screen panel according to claim 1, wherein the first electrode patterns adjacent to each other are connected to each other by the first connection patterns exposed from the insulation pattern.

* * * * *